UNITED STATES PATENT OFFICE.

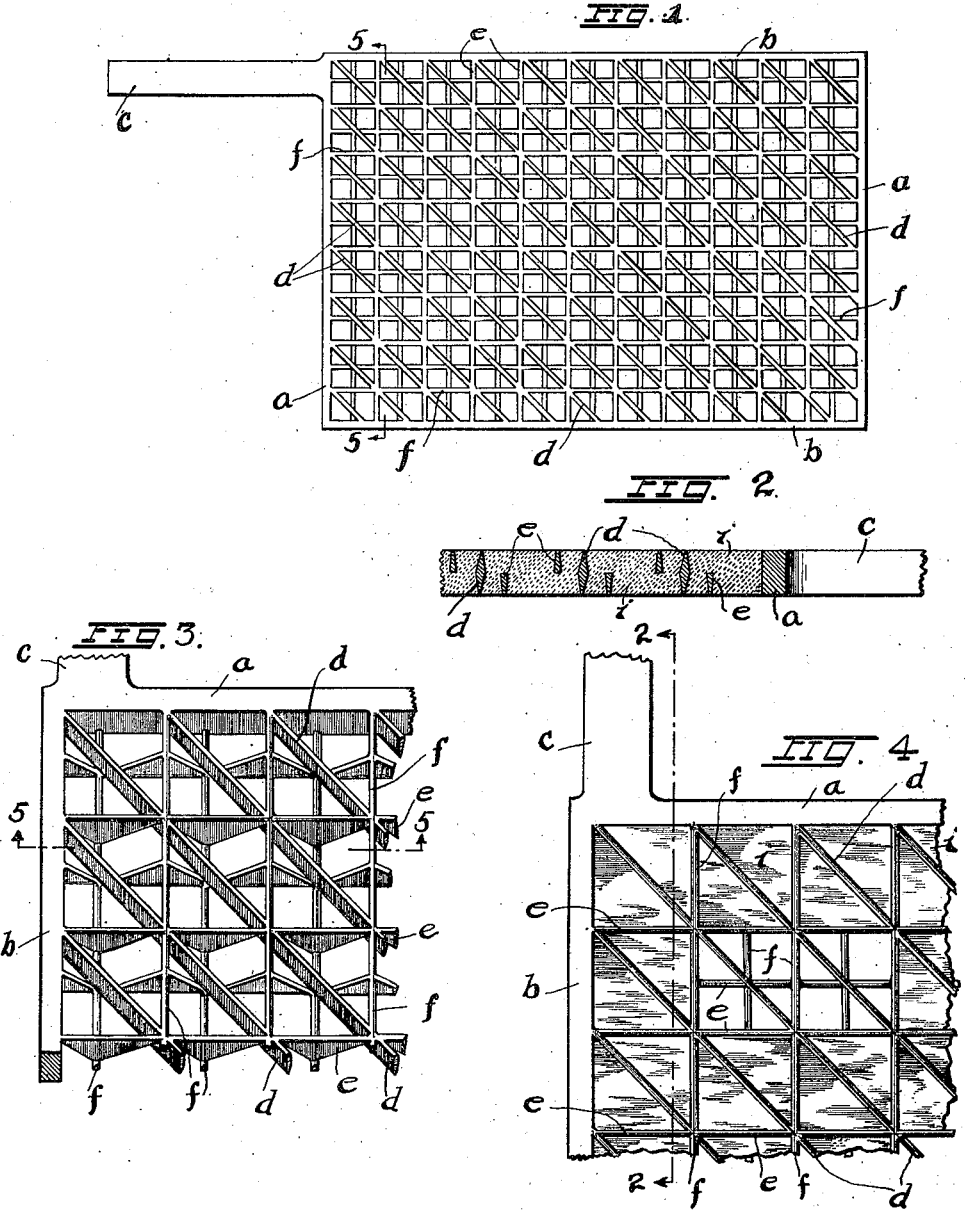

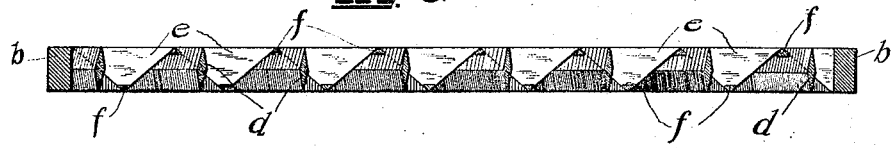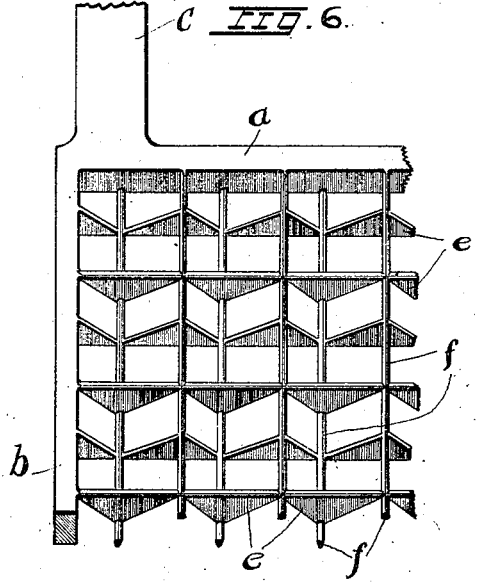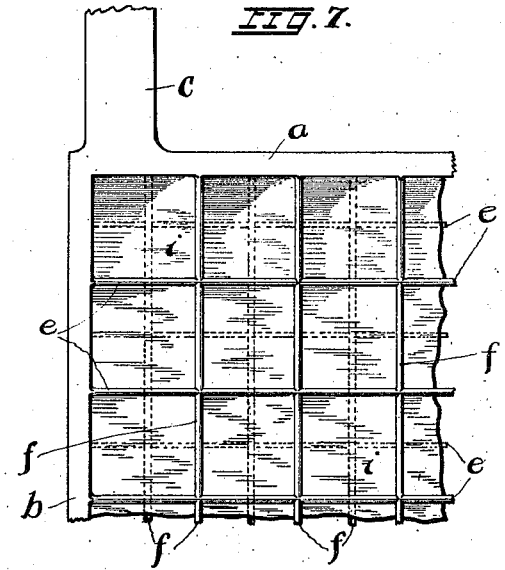

ALBERT C. DEIKE, OF CLEVELAND, OHIO, ASSIGNOR OF ONE-HALF TO FRANK ERNEST MATTHEWS, OF CLEVELAND, OHIO.

GRID FOR SECONDARY BATTERIES.

1,199,741.  Specification of Letters Patent.  Patented Sept. 26, 1916.

Application filed April 15, 1916. Serial No. 91,489.

*To all whom it may concern:*

Be it known that I, ALBERT CARL DEIKE, a citizen of the United States of America, residing at Cleveland, in the county of Cuyahoga and State of Ohio, have invented certain new and useful Improvements in Grids for Secondary Batteries, of which the following is a specification.

My invention relates to improvements in grids for secondary or storage batteries, and has for its object, the provision of a grid or support for the active material, wherein the same is molded; the said grid being of such strong construction, as will prevent warping, although of relatively light weight, while a low electrical resistance is maintained after continued use, and an adequate support is afforded for the active material.

In constructing a grid, it is highly desirable that a uniformity or regularity of design shall obtain, and furthermore, the body of active material should remain continuous, and unbroken in mass, so far as possible. Coupled with all this, is the requirement that the electrical resistance shall be relatively low, so that heating effects during discharge, may be largely eliminated, yet the mass of active material advantageously is maintained at a maximum, and the metal body of the grid at a minimum, in order to secure the highest efficiency within the cell. In consequence, much effort has been expended looking toward the proper design of the metal body or frame of the grid, which for commercial reasons, preferably must be kept within certain limits, as to size and weight. This latter consideration has become more and more important, in the light of extensive use of storage batteries upon automobile vehicles, and the grid herein shown and described, is especially designed for this service. As a final consideration, the constructor of a grid for use upon electric vehicles, must afford adequate support for the relatively heavy body of paste or oxid, to be molded within the grid, because of excessive vibration to which the battery necessarily is subjected in use. In improving upon the grid for secondary batteries, I have endeavored to keep all of these considerations and requirements in mind, giving due weight and importance to each, and thereby, I have been enabled to meet the problems with a structure better adapted to severe service, than any other with which I am acquainted.

The grid in question, comprises a rectangular frame, and diagonal supporting ribs substantially of the full width of the frame, which serve both as electrical conductors, extending generally toward a terminal of the grid, and as braces for strengthening the frame, and preventing any warping of the grid. Associated with these diagonal ribs, are transverse supports or shelves for the active material, which preferably are of staggered, serrated form, and these are connected by light vertical ribs, integral with the staggered points of serration; the whole being molded integrally from a suitable lead alloy. These several ribs and supports preferably are arranged in parallel relation each to each, so that the openings within the grid are uniform throughout its entire surface, and upon both sides. Details of this somewhat complex but effective grid structure, may be best explained by making reference to the accompanying sheet of drawings, wherein:—

Figure 1 is a plan view of a grid constructed in accordance with my invention. Fig. 2 is a transverse sectional view on line 2—2 of Fig. 4. Fig. 3 is a fragmentary portion of the upper terminal corner of the grid, in slight perspective. Fig. 4 is a similar fragment of the grid, showing the same filled with paste or oxid, except as to two central squares. Fig. 5 is a transverse sectional view on lines 5—5 of Figs. 1 and 3. Fig. 6 is a fragmentary portion of the upper terminal corner of a grid of modified construction, also in slight perspective, and Fig. 7 is a similar fragment of a modified grid suitably filled with active material.

Throughout the several figures of the drawings, I have employed the same character of reference to indicate similar parts. The latter figures are drawn upon a somewhat larger scale, to illustrate details of construction.

The grid shown in Fig. 1, comprises an oblong rectangular frame, *a, b,* having a terminal *c,* positioned at the upper left hand corner, as the structure is shown upon its side. Diagonally extending toward the terminal and its integral side frame, which is a prolongation thereof, are supporting ribs *d,* which serve also as conductors affording approximately the shortest paths for the generated current from distant points of the grid, to the terminal. Some six of these diagonal ribs, it is true, intersect the top frame a, which is directly connected with the terminal. However, these equally afford short paths for the electric current generated in the upper quarter of the battery plate. Transverse serrated supports e, alternating or staggered upon opposite sides of the grid, intersect the diagonal ribs just mentioned, which are the full thickness of the plate. Vertical ribs f of relatively small cross-section, intersect the diagonals, and form continuations of the serrated points of the transverse supports e. While I have spoken of these separate members or elements constituting the grid of my invention, it will be understood that the entire structure is cast integrally, as is usual with most battery grids, and it may be made from any suitable lead alloy.

An examination of Fig. 3, will disclose that the openings in my improved grid are of absolute uniformity, throughout the body thereof, comprising small squares which are intersected by a diagonal rib, the full width of the plate. This obtains excepting only the lowermost row of openings, Fig. 1, which are made slightly smaller, as a matter of design in the particular grid shown herein. These squares are defined upon the surface by narrow vertical ribs, in staggered relation upon opposite sides of the plate, and the full width of the edges of the transverse supports, excepting again, only those squares which are immediately adjacent to the frame. The typical squares are constituted as best shown in the two unfilled squares, centrally positioned in Fig. 4.

With the grid structure just described, well in mind, it will be seen that the body of active material is unbroken, as the same is molded within the openings of the grid, throughout diagonally extending sections, embraced between the parallel ribs d. This is true, for the reason that the horizontal supports carrying the weight of the oxid, are in staggered relation, and approach the surface only at their points of intersection with the narrow vertical ribs f, (speaking of the plate or electrode, of course, as it is positioned for service, with the terminal extending upright.) As thus supported, these continuous diagonal sections of active material are in close contact upon two sides with the embracing diagonal ribs d, and thereby the electrical conductivity of the battery plate is maintained at a maximum. On the other hand, said active material is supported from staggered serrated shelves, which are stayed by their integral connection with the vertical and diagonal ribs. Inasmuch as this construction maintains substantial uniformity of temperature throughout the entire body of the electrode, under conditions of charging and discharging the same, an excessive temperature is thereby avoided, and relatively little expansion occurs. Moreover, the grid structure is rigidly restrained from any buckling or warping action, which is a common cause of trouble in the ordinary type of grid.

By adopting the parallel diagonal ribs, which are of the full depth of the grid, not only is extreme strength insured, but the size and consequent weight of these ribs may be materially reduced, inasmuch as they supplement each other uniformly throughout all areas or sections of the grid. The transverse shelves or supports for the active material, although proportioned to have considerable body and stiffness, in the aggregate, are of relatively light weight, by reason of their staggered serrated form, supported as they are, from their serrated points, by the vertical surface ribs. The active material may be molded under high compression, within the openings, thereby bringing it into intimate relation with the metal bodies of the several supporting ribs, so that the resistance of the battery plate undergoes little variation, during continued use thereof. It will be observed that the spacing of the several parallel elements or members of my improved grid, is equal throughout, so that uniformity in the grid structure is obtained.

The continuity of the body of active material $i$, is best shown in Fig. 2, wherein the supporting shelves e, extend in staggered relation half-way through the depth of the grid, in the section shown, but the body of material is continuous between the diagonal ribs d, although adequately supported upon the serrated shelves.

Fig. 5 well illustrates in enlarged detail, the several members forming my improved diagonally stayed grid, as viewed in cross-section. However, it is quite practicable, to omit some or all of the diagonals, as illustrated in Figs. 6 and 7, wherein active material is supported as before, from the serrated shelves e, stayed at their points or apexes, by the vertical ribs f. Absolute uniformity is retained in this type of grid, and it is well adapted for service under conditions of less severe use, than the preferred type shown in the earlier figures of the drawings. Otherwise, details are as already described, but it will be understood that my invention is not necessarily limited to the features not expressly recited in the appended claims.

Having now described the preferred embodiment of my invention, I claim as new, and desire to secure by Letters Patent, the following:—

1. A grid for secondary batteries, comprising a rectangular frame, a terminal positioned adjacent to one corner thereof, diagonally positioned ribs of substantially the full thickness of the frame extending generally toward said corner for conducting the current and stiffening the grid, and uniformly spaced continuous transverse members for supporting the oxid filling connected with said diagonal strip, substantially as set forth.

2. A grid for secondary batteries, comprising a rectangular frame, a terminal disposed adjacent to one corner of the frame, parallel diagonally disposed ribs of substantially the full thickness of the frame extending toward the terminal and intersecting the sides of the frame, uniformly-spaced continuous parallel transverse ribs for supporting the oxid filling connected with said diagonal ribs and with the frame, and intersecting surface ribs extending vertically of the frame, substantially as set forth.

3. A grid for secondary batteries, comprising a rectangular frame, a terminal positioned at the upper portion thereof, diagonal ribs extending from the lower portions toward the terminal of substantially the full thickness of the grid, transverse serrated supports in staggered relation intersecting said ribs, and staggered vertical ribs intersecting said supports at their serrated points; all integrally molded, substantially as set forth.

4. A grid for secondary batteries, comprising a rectangular frame, a terminal disposed adjacent to one corner of the frame, parallel diagonal ribs extending from the lower portions of the grid, generally toward said terminal, and respectively intersecting one or more sides of the frame, transverse serrated supports intersecting said diagonal ribs, and vertical surface ribs intersecting the serrated points of said supports; the several members being respectively parallel each to each, and disposed at uniform spacings within the frame, substantially as set forth.

5. A grid for secondary batteries, comprising an integral casting, having a rectangular frame, a terminal disposed adjacent to one corner of said frame, parallel diagonal ribs of substantially the full thickness of the frame, parallel transverse serrated ribs extending from side to side of the frame, and alternately staggered parallel vertical ribs extending from the top to the bottom of the frame, and staggered upon opposite sides to intersect the serrated supports; all of said parallel members having uniform spacing, substantially as set forth.

6. A grid for secondary batteries, comprising a rectangular frame, transversely positioned shelves or supports of serrated form in staggered relation upon opposite sides of the grid, and vertical ribs intersecting the points of the serrated shelves and supporting the same, in staggered relation upon opposite sides of the grid, substantially as set forth.

7. A grid for secondary batteries, comprising a rectangular frame, a terminal extending from the upper portion of said frame, parallel diagonal ribs extending from the lower portions generally toward the terminal of the grid; the same being substantially the full depth or thickness of the grid, and transverse serrated supports in staggered relation intersecting said ribs, and adapted to carry the weight of the oxid filling; all integrally molded with the frame, substantially as set forth.

In testimony whereof I do now affix my signature in the presence of two witnesses.

ALBERT C. DEIKE. [L. S.]

Witnesses:
 FRANK BUBUA,
 ALBERT LYNN LAWRENCE.